United States Patent Office 2,880,776
Patented Apr. 7, 1959

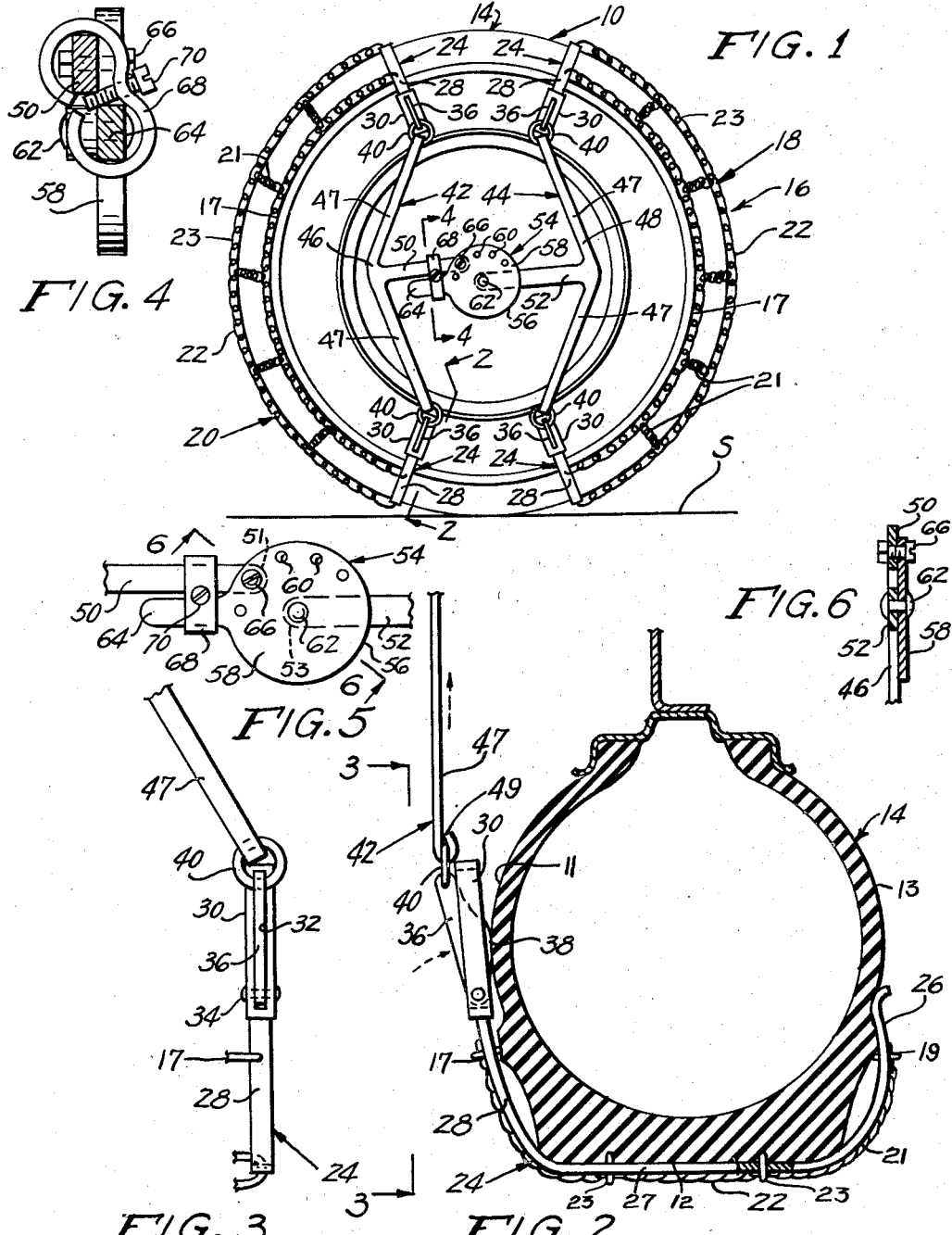

2,880,776

EMERGENCY TRACTION ASSEMBLY FOR VEHICLE WHEELS

Ralph V. Rucker, Charleston, W. Va., assignor of one-half to Abe Boirasky, Charleston, W. Va.

Application October 5, 1956, Serial No. 614,200

2 Claims. (Cl. 152—213)

This invention relates generally to an improved emergency traction assembly for vehicle wheels of the type which is applicable to vehicle wheels in contact with the ground without jacking up a vehicle.

The primary object of the invention is to provide a generally superior and more practical and efficient device of this kind which involves only two traction shoes of unusually great length, which embrace major portions of the periphery of the vehicle tire in opposed relation to each other, and which involves more efficient and reliable and more easily operated mechanism for drawing the shoes toward each other and locking the shoes securely on the tire.

Another object of the invention is to provide an emergency traction assembly of the character indicated which can be made in rugged and serviceable forms at relatively low cost, is easily installed, and is highly satisfactory, practical and efficient for the purpose intended.

These together with other objects and advantages which will become apparent reside in the details of construction and operation as more fully hereinafter described, reference being had to the accompanying drawings forming a part hereof, wherein like numerals refer to like parts throughout the several views, and in which:

Figure 1 is an outboard side elevational view, showing a device in accordance with the present invention applied to a pneumatic tired vehicle wheel;

Figure 2 is an enlarged fragmentary transverse vertical sectional view taken substantially on line 2—2 of Figure 1;

Figure 3 is a fragmentary outboard side elevational view taken on the line 3—3 of Figure 2;

Figure 4 is an enlarged fragmentary transverse sectional view taken substantially on line 4—4 of Figure 1;

Figure 5 is an enlarged fragmentary outboard side elevational view of a portion of Figure 1; and Figure 6 is a fragmentary enlarged transverse sectional view taken substantially on line 6—6 of Figure 5.

Referring to the drawings in detail, a conventional vehicle wheel 10 is shown which has thereon a pneumatic tire 14, which has outboard and inboard sides 11 and 13, and a read 12.

The illustrated traction device, indicated generally at 16, comprises a single pair of similar, separate and diametrically opposed traction shoes, indicated generally at 18 and 20.

The traction shoes 18 and 20 comprise skid chain segments 22 which embrace substantial portions of the periphery of the tire 14, and leave only minor portions of the periphery of the tire exposed therebetween. The segments 22 are preferably composed of side chains 17 and 19, cross chains 21, and tread engaging chains 23. Opposite ends of the segments 22 are suitably secured to relatively rigid U-shaped tire-embracing bars 24, one of which is shown in detail in Figure 2.

The bars 24 comprise inboard and outboard legs 26 and 28 on opposite ends of a tire tread engaging bight portion 27. The leg 28 has a longitudinal extension 30 having therein a longitudinal slot 32 traversed near its lower or radially outward end by a pivot 34. A lever cam 36 is positioned longitudinally in the slot 32 and has its radially outward end pivoted on the pivot 34. The lever 36 has on its inboard edge a longitudinally curved cam lobe 38, Figure 2, engageable with the outboard side of the tire 14. A connecting link 40 is engaged through the radially curved end of the lever cam 36.

Indicated at 42 and 44 are substantially similar, but reversed and opposed T-shaped frames, to be located at the outboard side of the vehicle wheel, Figure 1. The frame 42 comprises a cross head portion 46 composed of similarly angled arms 47 the free ends of which are secured, as indicated at 49, to the links 40 of the U-shaped arms 24 of the traction shoe 20. The frame 44 comprises a cross head portion 48 composed of similarly angled arms 47 whose free ends are similarly secured to the links 40 of the U-shaped bars 24 of the traction shoe 18. The frames 42 and 44 have standard portions 50 and 52, respectively, which extend toward and generally parallel to each other when the assembly is in place on a vehicle wheel.

Acting between the inner ends 51 and 53 of the standard portions 50 and 52, respectively, is a tensioning assembly 54 comprising a lever 56 having a circular disc portion 58 having therein a plurality of circumferentially spaced holes 60. The disc 58 is centrally pivoted on the inner end 53 of the standard 52 by a pivot 62. The lever 56 further comprises a hand lever 64 projecting radially from the disc 58.

On the inner end 51 of the standard 50 is a bolt 66 which optionally extends through a selected one of the holes 60 in the disc portion of the lever 56, as shown in Figures 4 and 5. By reason of this arrangement, manual pivoting of the lever 56 in a clockwise direction, as seen in Figure 1, pulls the standards 50 and 52, and hence the frames 42 and 44, toward each other, so as to tighten the traction shoes 18 and 20 on the related portions of the tire 14. As the frames 42 and 44 are thus drawn toward each other, the lever cams 36 are rotated clockwise, as indicated by the arrow in Figure 2, whereby the cam lobes 38 are pressed against the outboard side of the tire 14, so as to increase the grip of the U-shaped bars 24 on the tire 14.

In order to prevent counterclockwise, retracting rotation of the lever 56, a loop 68, slidably mounted on the standard 50, is movable to engage around the handle 64 of the lever 56, Figure 4. A locking screw 70 is threaded through one side of the loop 68 and is engageable with the standard 50 and the handle 64 to prevent the loop 68 from becoming displaced and releasing the handle 64.

The foregoing is considered illustrative only of the principles of invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. In a traction assembly for a vehicle wheel having a tire thereon, two diametrically opposed traction shoes to engage major portions of the periphery of a tire, each of said shoes comprising a pair of circumferentially spaced U-shaped tire-embracing bars having tire tread engaging bight portions and inboard and outboard legs for engaging inboard and outboard sides of a tire, longitudinal extensions on the outboard legs, a substantially rigid T-shaped frame disposed at the outboard side of a vehicle wheel inwardly of each traction shoe, said frames having cross heads including arms having free ends and standards projecting radially inwardly from the cross heads and having inner ends, means flexibly connecting the free ends of said cross head arms to the extensions of the U-shaped bars of related traction shoes, and tensioning means acting between the inner ends of the standards, said connecting means comprising lever cams pivoted on said extensions to which the free ends of the frame arms are connected, said lever cams having cam lobes engageable with the outboard side of a tire while said tensioning means is in tension producing position.

2. A ttraction assembly for a vehicle wheel mounted tire, comprising two diametrically opposed rigid T-shaped frames, said frames having cross heads and standards projecting radially inwardly from the intermediate portions of the cross head, tire embracing bars connected to opposite ends of said cross head, said bars having radially inwardly projecting extensions on one end thereof, cam levers extending along and pivoted on said extensions, said cam levers having lobes for engaging a related side of a wheel tire, means flexibly and operatively connecting the cam levers to related cross head ends, and tensioning means connecting to and acting between said standards for contracting the tire embracing bars on a tire and engaging the cam lobes with a side of a tire.

References Cited in the file of this patent

UNITED STATES PATENTS

| | | |
|---|---|---|
| 1,758,944 | Grosch | May 20, 1930 |
| 1,800,877 | Vosburgh | Apr. 14, 1931 |
| 2,273,753 | Gelinas | Feb. 17, 1942 |
| 2,586,049 | Jacobs | Feb. 19, 1952 |